US009453604B1

(12) United States Patent
Maloney et al.

(10) Patent No.: US 9,453,604 B1
(45) Date of Patent: Sep. 27, 2016

(54) HOLLOW POROUS MATERIALS WITH ARCHITECTED FLUID INTERFACES FOR REDUCED OVERALL PRESSURE LOSS

(71) Applicant: HRL LABORATORIES, LLC, Malibu, CA (US)

(72) Inventors: Kevin J. Maloney, Santa Monica, CA (US); Christopher S. Roper, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 503 days.

(21) Appl. No.: 13/786,367

(22) Filed: Mar. 5, 2013

(51) Int. Cl.
F16L 41/00 (2006.01)
B01F 5/06 (2006.01)

(52) U.S. Cl.
CPC ............... *F16L 41/00* (2013.01); *B01F 5/06* (2013.01); *B01F 5/0698* (2013.01); *F28F 2210/00* (2013.01)

(58) Field of Classification Search
CPC ...... B01F 5/06; B01F 5/0698; F28F 2210/00
USPC ........ 165/185; 361/698; 137/599.01; 138/42
See application file for complete search history.

(56) References Cited

U.S. PATENT DOCUMENTS

| | | | |
|---|---|---|---|
| 2,710,443 A * | 6/1955 | Webb ................... | B23K 9/0288 188/77 R |
| 3,435,893 A * | 4/1969 | Withers ......................... | 165/158 |
| 4,125,152 A * | 11/1978 | Kestner et al. ................ | 165/133 |
| 4,183,890 A | 1/1980 | Bollinger | |
| 4,369,605 A | 1/1983 | Opersteny et al. | |
| 4,498,616 A | 2/1985 | Runkle | |
| 4,683,121 A * | 7/1987 | Goudriaan ................. | B01J 8/06 422/311 |
| 5,667,168 A | 9/1997 | Fluegel | |
| 6,623,687 B1 | 9/2003 | Gervasi et al. | |
| 7,190,580 B2 * | 3/2007 | Bezama et al. ............... | 361/699 |
| 7,253,372 B2 | 8/2007 | Ananthanarayanan et al. | |

(Continued)

FOREIGN PATENT DOCUMENTS

EP 2775244 A1 9/2014
SU GB 2048108 A * 12/1980 ............... B01D 3/22

(Continued)

OTHER PUBLICATIONS

U.S. Appl. No. 13/618,616 entitled: Hollow Polymer Micro-Truss Structures Containing Pressurized Fluids, filed Sep. 14, 2012, file history, 149 pgs.

(Continued)

*Primary Examiner* — Craig Schneider
*Assistant Examiner* — Josephine Trinidad-Borges
(74) *Attorney, Agent, or Firm* — Lewis Roca Rothgerber Christie LLP

(57) ABSTRACT

A structure including a hollow porous material with an architected fluid interface to the hollow porous material and methods of forming the same. The architected fluid interface may be in the form of a manifold with tapered openings, each providing a gradually narrowing transition to the hollow channels within which fluid may flow through the hollow porous material. The material may be formed by forming an open-celled sacrificial scaffold, immersing one surface of the open-celled sacrificial scaffold in a bonding agent, attaching a face sheet to the surface to form a sacrificial scaffold assembly, coating the assembly with a coating material, and removing the sacrificial scaffold assembly.

15 Claims, 10 Drawing Sheets

(56) References Cited

U.S. PATENT DOCUMENTS

| | | | |
|---|---|---|---|
| 7,382,959 B1 | 6/2008 | Jacobsen | |
| 7,653,276 B1 | 1/2010 | Gross et al. | |
| 7,687,132 B1 | 3/2010 | Gross et al. | |
| 8,573,289 B1 | 11/2013 | Roper et al. | |
| 8,585,944 B1 | 11/2013 | Jacobsen | |
| 2003/0010483 A1* | 1/2003 | Ikezaki | F28F 3/083 165/174 |
| 2006/0101849 A1* | 5/2006 | Taras | F25B 39/00 62/515 |
| 2010/0101978 A1* | 4/2010 | Gordon et al. | 208/49 |
| 2010/0300669 A1* | 12/2010 | Jacobsen et al. | 165/185 |
| 2014/0251585 A1 | 9/2014 | Kusuda et al. | |

FOREIGN PATENT DOCUMENTS

| | | |
|---|---|---|
| WO | WO 2004/063639 A2 | 7/2004 |
| WO | WO 2010/061235 A1 | 6/2010 |
| WO | WO 2011051106 A1 * | 5/2011 |

OTHER PUBLICATIONS

Wilcox, "Elements of Fluid Mechanics," DCW Industries, p. 256, 2005.

Extended European Search Report for Application No. 14157663.7, dated May 20, 2014, 5 pages.

Canadian Examination Search Report for Application No. 2,836,709, dated Dec. 30, 2014, 3 pages.

U.S. Appl. No. 13/785,973 entitled: Micro-lattice Cross-flow Heat Exchangers for Aircraft, filed Mar. 5, 2013, 204 pages.

Maloney et al., "Multifunctional Heat Exchangers Derived from Three-dimensional Micro-lattice Structures," HRL Laboratories, LLC, Jan. 1, 2012, 41 pages.

Fink, "Micro-truss structures as cross-flow heat exchangers," HRL Laboratories, LLC, Dec. 1, 2010, 32 pages.

Fink et al., "Fluid Dynamics of Flow Through Microscale Lattice Structures Formed from Self-Propagating Photopolymer Waveguides," AIChE Journal, 57(10):2636-2646, Oct. 2011.

CIPO Office Action for CA Patent Application No. 2,836,709, dated Feb. 10, 2015, 3 pages.

CIPO Office Action for CA Patent Application No. 2,836,709, dated Dec. 21, 2015, 3 pages.

EPO Examination and Search Report for EP Application No. 14157663.7, dated May 20, 2014, 5 pages.

EPO Examination Report for EP Application No. 14157663.7, dated Oct. 9, 2015, 4 pages.

USPTO Office Action for U.S. Appl. No. 13/785,973, dated Sep. 9, 2015, 9 pages.

USPTO Office Action for U.S. Appl. No. 13/785,973, dated Dec. 1, 2015, 15 pages.

Maloney, K.J. et al., Multifunctional Heat Exchangers Derived from Three-Dimensional Micro-Lattice Structures, International Journal of Heat and Mass Transfer, 2012, 8 pages.

Roper, C.S. et al., Scalable Three-Dimensional Bicontinuous Fluidic Networks: Polymer Heat Exchanges and Towards Artificial Organs, Supporting Information, Mar. 5, 2015, 1 page.

Roper, C.S. et al., Scalable 3D Bicontinuous Fluid Networks: Polymer Heat Exchangers Toward Artificial Organs, Advanced Materials, Mar. 5, 2015, 6 pages.

U.S. Appl. No. 13/618,616, Roper et al.
U.S. Appl. No. 14/185,665, Roper et al.
U.S. Appl. No. 14/676,794, Roper et al.

* cited by examiner

HOLLOW POROUS MATERIALS WITH ARCHITECTED FLUID INTERFACES FOR REDUCED OVERALL PRESSURE LOSS

CROSS-REFERENCE TO RELATED APPLICATION(S)

The present application is related to U.S. patent application Ser. No. 13/618,616, filed on Sep. 14, 2012, entitled "HOLLOW POLYMER MICRO-TRUSS STRUCTURES CONTAINING PRESSURIZED FLUIDS", the entire content of which is herein by reference, and to U.S. Pat. No. 7,382,959, entitled "OPTICALLY ORIENTED THREE-DIMENSIONAL POLYMER MICROSTRUCTURES", the entire content of which is herein by reference.

FIELD

The present invention relates to fluid flow interfaces to hollow porous materials and methods of forming the same, and more particularly to interfaces providing reduced pressure loss for fluid entering a hollow porous material and increased pressure recovery for fluid exiting a hollow porous material and methods of forming the same.

BACKGROUND

In applications requiring flow through porous materials such as micro-truss heat exchangers, interfacial pressure loss may represent 7-28% of the component pressure loss.

For example, in one method for providing access to a plurality of hollow tubes the ends of the tubes may be embedded in an epoxy or similar brittle matrix. The epoxy is then fractured in a controlled fashion to reveal a leak-tight fluid interface with the hollow porous material with nearly all pores open to flow.

The interface generated using this method, however, results in significant flow separation, and a vena contracta near the opening of each tube that may be substantially smaller than the inner diameter of the tube. Sharp edges and surfaces normal to the direction of flow cause greater flow disruption and greater component-level pressure loss. The head loss coefficient for flow encountering a right-angle inlet is approximately 0.5, while the head loss coefficient for a filleted inlet is as low as 0.04.

Conventional machining methods for reducing flow disruption by creating a smooth transition at the interface and/or expanding the vena contracta may be prohibitively costly when applied to an interface with a hollow porous material, because such an interface may involve a large number of pores of small diameter.

Thus, there is a need for a cost-effective fluid flow interface to a hollow porous material, which reduces discontinuities and sharp edges and consequently reduces flow disruption, reduces pressure drop for fluid flowing into the hollow porous material, and/or increases pressure recovery for fluid exiting the hollow porous material.

SUMMARY

The present invention relates to interfaces to hollow porous materials, for reducing pressure loss for fluids flowing through such materials. In one embodiment, such interfaces may be formed by first forming a sacrificial scaffold assembly from an open-celled sacrificial scaffold, which is partially immersed in a bonding agent and to which one or more face sheets are secured using the bonding agent. The sacrificial scaffold assembly is then coated with a suitable material and the sacrificial scaffold assembly is removed, leaving the coating as a hollow open-cell porous material with architected fluid interfaces.

According to an embodiment of the present invention there is provided a structure including: a structure body, including a plurality of hollow channels having walls, and a first manifold on a first surface of the structure body, the first manifold including a first plurality of tapered openings into the hollow channels, wherein the hollow channels interpenetrate each other at a plurality of hollow nodes having walls, and wherein the walls of the hollow channels, the walls of the hollow nodes, and the manifold include a continuous material.

In one embodiment, the cross section of each tapered opening of the first plurality of tapered openings is a polygon.

In one embodiment, the cross section of each tapered opening of the first plurality of tapered openings is a quadrilateral and each tapered opening has the shape of a hollow pyramid.

In one embodiment, the hollow channels are hollow truss elements within a hollow three-dimensional micro-truss.

In one embodiment, the hollow three-dimensional micro-truss includes: a plurality of first hollow truss elements extending along a first direction; a plurality of second truss hollow truss elements extending along a second direction; and a plurality of third truss hollow truss elements extending along a third direction.

In one embodiment, the hollow truss elements are substantially tubular, and the inner diameter of the hollow channels is at least 10 microns and at most 2 millimeters.

In one embodiment, the wall thickness of the hollow truss elements is at least 10 nanometers and at most 0.5 millimeters.

In one embodiment, the length of the hollow truss elements is at least 40 microns and at most 25 millimeters.

In one embodiment, the structure includes a second manifold on a second surface of the structure body, the second manifold including a second plurality of tapered openings into a plurality of the hollow channels.

In one embodiment, at least one of the tapered openings of the first plurality of tapered openings is in fluid communication with at least one of the tapered openings of the second plurality of tapered openings.

In one embodiment, the structure includes as a major component, a substance selected from the group consisting of polymers, metals, ceramics, composite materials, hydrophilic materials, hydrophobic materials, photocatalytic materials, and combinations thereof.

In one embodiment, the structure includes, as a major component, a polymer selected from the group consisting of fluoropolymers, parylene AF4, parylene-N, parylene-C, and combinations thereof.

In one embodiment, the structure body is a hollow open-cell foam.

In one embodiment, the walls of the hollow channels, the walls of the hollow nodes, and the manifold include two layers of different materials.

According to an embodiment of the present invention there is provided a method for forming a three-dimensional hollow open-celled structure with attached manifold, the method including: forming an open-celled sacrificial scaffold; forming a sacrificial manifold core on a first surface of the open-celled sacrificial scaffold; forming a coating on the open-celled sacrificial scaffold and on the sacrificial manifold core; and removing the open-celled sacrificial scaffold and the sacrificial manifold core to form the three-dimensional hollow open-celled structure with an attached manifold.

In one embodiment, the forming of the sacrificial manifold core on the first surface of the open-celled sacrificial scaffold includes: immersing the first surface of the open-celled sacrificial scaffold in a liquid matrix to a first depth; applying a face sheet to the first surface of the open-celled sacrificial scaffold; and solidifying the liquid matrix.

In one embodiment, the liquid matrix includes thiol-ene as a major component.

In one embodiment, the face sheet includes, as a major component, a substance selected from the group consisting of polylactic acids, thiol-enes, and combinations thereof.

In one embodiment, the first surface is substantially planar.

In one embodiment, the first depth is one-half a unit cell dimension in the direction perpendicular to the first surface.

In one embodiment, the open-celled sacrificial scaffold includes thiol-ene as a major component.

In one embodiment, the coating includes, as a major component, a substance selected from the group consisting of polymers, metals, ceramics, composite materials, hydrophilic materials, hydrophobic materials, photocatalytic materials, and combinations thereof.

In one embodiment, the coating includes, as a major component, a polymer selected from the group consisting of fluoropolymers, thiol-enes, parylene AF4, parylene-N, parylene-C, and combinations thereof.

In one embodiment, the removing of the open-celled sacrificial scaffold and the sacrificial manifold core includes etching out the open-celled sacrificial scaffold and the sacrificial manifold core using an etchant.

In one embodiment, the etchant includes, as a major component, a base solution.

In one embodiment, the etchant includes, as a major component, a substance selected from the group consisting of sodium hydroxides, potassium hydroxides, low molecular weight alcohols, water, lithium bromides, organic amine bases, and combinations thereof.

In one embodiment, the removing of the open-celled sacrificial scaffold and the sacrificial manifold core further includes exchanging for the etchant a liquid selected from the group consisting of low molecular weight alcohols, liquid carbon dioxides, and combinations thereof.

In one embodiment, the density of the liquid differs from the density of the etchant by at least 1%.

In one embodiment, the removing of the open-celled sacrificial scaffold and the sacrificial manifold core further includes removing a liquid by freeze drying or supercritical drying.

In one embodiment, the removing of the open-celled sacrificial scaffold and the sacrificial manifold core includes burning out the open-celled sacrificial scaffold and the sacrificial manifold core.

In one embodiment, the method includes selectively removing portions of the coating before the removing of the open-celled sacrificial scaffold and the sacrificial manifold core.

In one embodiment, the open-celled sacrificial scaffold is an open-celled sacrificial scaffold, including: a plurality of first truss elements defined by a plurality of first self-propagating polymer waveguides and extending along a first direction; a plurality of second truss elements defined by a plurality of second self-propagating polymer waveguides and extending along a second direction; and a plurality of third truss elements defined by a plurality of third self-propagating polymer waveguides and extending along a third direction.

In one embodiment, the open-celled sacrificial scaffold is an open-cell foam.

In one embodiment, the method includes providing a particulate filter in the manifold.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of exemplary embodiments of a hollow porous material with architected fluid interfaces for reduced overall pressure loss provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
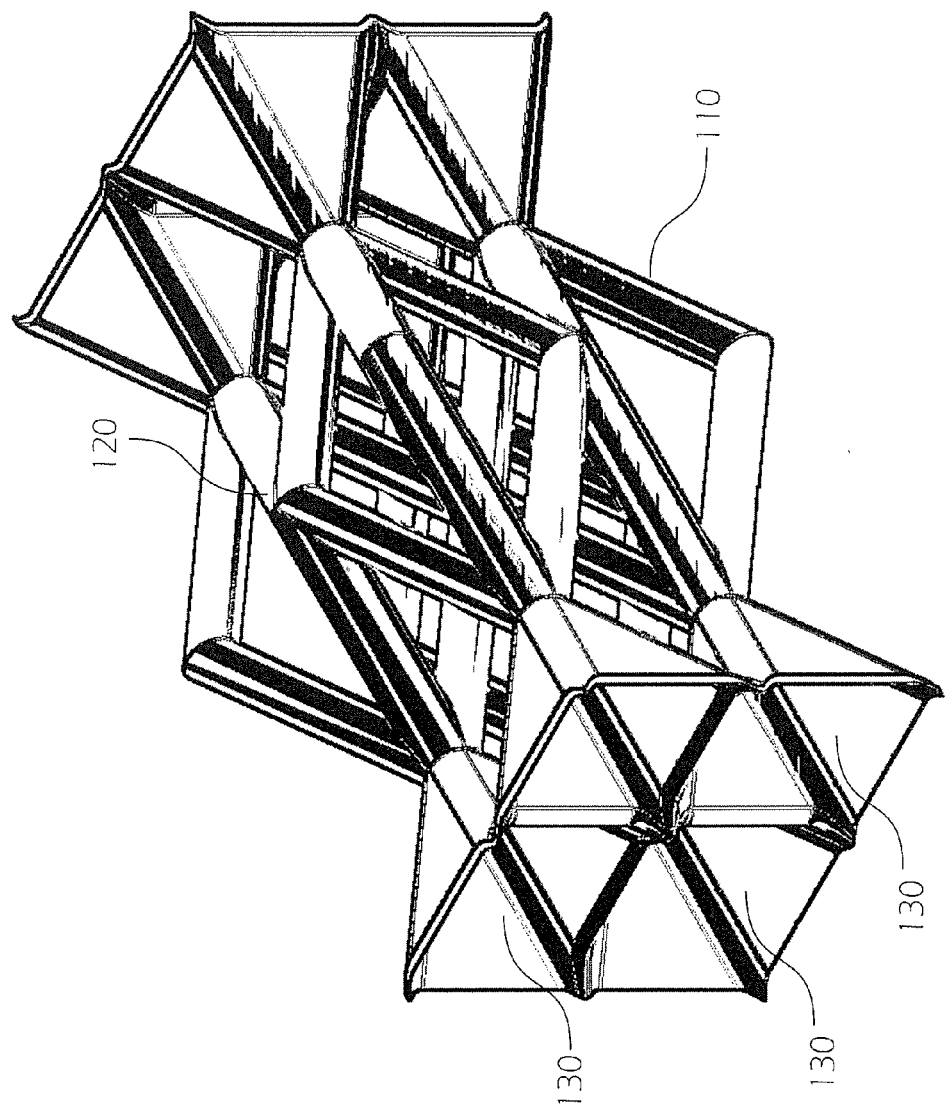
FIG. 1 is a perspective view of a hollow porous material with architected fluid interfaces for reduced overall pressure loss according to an embodiment of the present invention.

According to embodiments of the present invention, the adverse effects of flow disruption may be reduced, at an interface at which a fluid flows through pores on the surface of a porous material into channels in the interior of the material, by altering the structure of the interface near each pore. Referring to FIG. 1, in one embodiment, the hollow porous material may be a polymer micro-truss structure in the form of a regular hollow three-dimensional micro-truss of intersecting tubes 110, configured with hollow nodes 120 at the intersections of the tubes 110, so that the interior of each tube 110 is in communication with any other tube 110 it intersects. Access to the interior fluid volume, formed by the connected interiors of the intersecting tubes 110, may be provided by an architected fluid interface, which may also be referred to as a manifold, at each end of the structure. The manifold may include a tapered opening into individual tubes 110, or, as illustrated in FIG. 1, into groups of tubes 110, there being four tubes 110 in each such group in FIG. 1. In the embodiment illustrated in FIG. 1, the tapered opening may be in the form of a funnel or hollow pyramid 130, with a depth approximately or substantially equal to one half of the length, in the direction of the bore of the funnel, of a unit cell of the hollow three-dimensional micro-truss of intersecting tubes 110. Smooth transitions of this sort, using tapered openings, at an interface between a bulk fluid and a hollow porous material may result in significantly lower pressure drop for fluid flowing into the hollow tubes 110 and higher pressure recovery for fluid exiting the tubes 110 than manifolds having a flat surface with a flush hole for each tube 110. In particular, the head loss coefficient of flow encountering a right-angle inlet is approximately 0.5, while the head loss coefficient for a filleted inlet is as low as 0.04, representing an improvement of 12.5 times.

A structure such as that of FIG. 1 may be fabricated as follows. First, an ordered three dimensional (3D) micro-truss of polymer waveguides, of the sort disclosed in U.S. Pat. No. 7,382,959 may be formed, and used as an open-celled sacrificial scaffold subsequently made part of a sacrificial scaffold assembly. In an exemplary process for forming such an open-celled sacrificial scaffold, a suitable photopolymerizable resin may be poured into a tray and covered with a mask having an array of holes. The tray may be irradiated, through the mask, with collimated light. The collimated light entering the mask from a given direction through a given hole in the mask takes the shape of a beam of light in the resin, causing one or more chemical changes in the resin within the beam. These chemical changes may affect the index of refraction, and as a result the beam may cause a waveguide to form in the resin, which then in turn guides the beam along the path where the waveguide has already formed. In particular, in one embodiment of the present invention, the collimated light may cause the resin to polymerize, resulting in a three-dimensional micro-truss. The unreacted resin may then be washed away, leaving the open-celled sacrificial scaffold. In other embodiments, an open-celled sacrificial scaffold of a different form, such as a sacrificial open-cell foam, may be used in the same manner as a three-dimensional micro-truss sacrificial scaffold.

Figure 2:
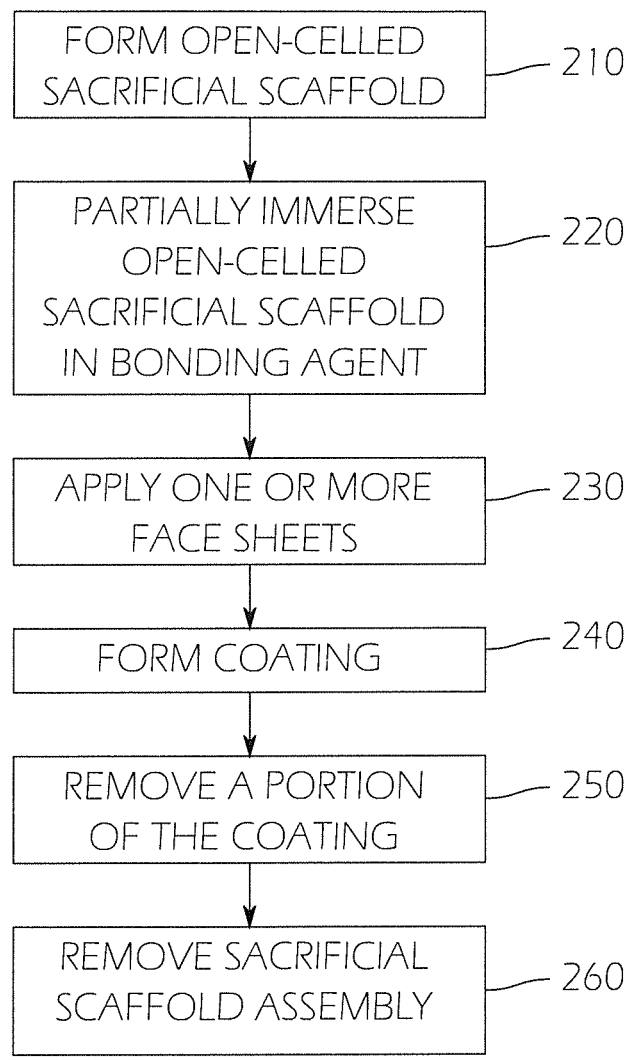
FIG. 2 is a flow chart illustrating acts in fabricating a hollow porous material with architected fluid interfaces according to an embodiment of the present invention.

Referring to FIG. 2, the process of forming a hollow porous material with architected fluid interfaces may begin with the act 210 of forming an open-celled sacrificial scaffold. Subsequently the open-celled sacrificial scaffold may, in an act 220, be partially immersed in a bonding agent which may also be referred to as a matrix, causing a surface of the open-celled sacrificial scaffold to be wetted with the bonding agent and, depending on the depth of immersion, causing the bonding agent to penetrate to some depth into the open-celled sacrificial scaffold. In a subsequent act 230, the same bonding agent may be used as an adhesive for holding in place a face sheet which may be applied to the surface of the open-celled sacrificial scaffold. The acts 220 and 230 may then be repeated for one or more additional surfaces of the open-celled sacrificial scaffold. The face sheets may be applied, for example, to two opposite and parallel faces of the open-celled sacrificial scaffold. The bonding agent used may be chemically similar to the open-celled sacrificial scaffold such that both materials can be chemically etched in the same solution. In one embodiment, a thiol-ene polymer may be used both to create the open-celled sacrificial scaffold and as the bonding agent, and possibly also for the face sheet. In one embodiment, the face sheet material is an aliphatic polyester, e.g., polylactic acid. This assembly, including the open-celled sacrificial scaffold, the bonding agent, and the face sheets may then be used as a sacrificial scaffold assembly.

In a subsequent act 240, the sacrificial scaffold assembly may be coated with a polymer, metal, ceramic or composite material. The coating may be highly conformal, having, e.g., thickness variation throughout the sacrificial scaffold of less than 10% of the total coating thickness, and it may have etch selectivity to the sacrificial scaffold, making it possible, with a suitable etchant, to etch the sacrificial scaffold at a rate multiple orders of magnitude faster than the coating. In one embodiment, the polymer coating is the fluoropolymer parylene AF-4, which may also be referred to as PARYLENE HT™ or parylene SF. Potentially suitable coating processes include chemical vapor deposition, hot-wire chemical vapor deposition, layer-by-layer assembly, powder metallurgy, electroplating, electroless plating, and slurry coating.

Various materials may be used to form the coating, including polymers (e.g. fluoropolymers) metals (e.g. nickel, copper, aluminum), and ceramics. Hydrophilic or hydrophobic materials, and photocatalytic materials may be used for the coating. Composite materials composed of a combination of the previously-mentioned materials may also be used. Possible composite configurations include serial conformal coatings of one or more materials, e.g., the sacrificial scaffold assembly may first be coated with a first material, and then the coated sacrificial scaffold assembly may be coated with a second material, so that the final coating may be composed of layers of two or more different materials. These serial coatings may all be formed before removal of the open-celled sacrificial scaffold, or some layers may be deposited on top of a previously formed coating after removal of the open-celled sacrificial scaffold. The open-celled sacrificial scaffold may also be composed of several different materials.

In a subsequent act 250 portions of the coating material may be removed to allow access to the interior materials, i.e., to the sacrificial scaffold. This may be done by scoring the surface of the coated sacrificial scaffold and peeling off regions of unwanted coating. A sharp tool such as a razor blade may be used to score the surface. In one embodiment, the coating may be peeled from the outer surfaces of the face sheets, to provide access to a large surface of the sacrificial scaffold.

In a subsequent act 260, the sacrificial scaffold may be removed from within the coating, for example by using a base solution to selectively chemically etch out the scaffold. A suitable base solution may be sodium hydroxide (NaOH) or potassium hydroxide (KOH) in water. The etch solution may be chosen so that it wets into the open-celled sacrificial scaffold, and, for example, if the coating is a fluoropolymer, an etch solution of water, a low molecular weight (MW) alcohol such as methanol, and a base, e.g. NaOH or KOH, may be used. In another embodiment, if the coating is sufficiently robust to withstand the process, the sacrificial scaffold may be burned out by exposing the assembly to oxygen at high temperature.

Figure 3A:
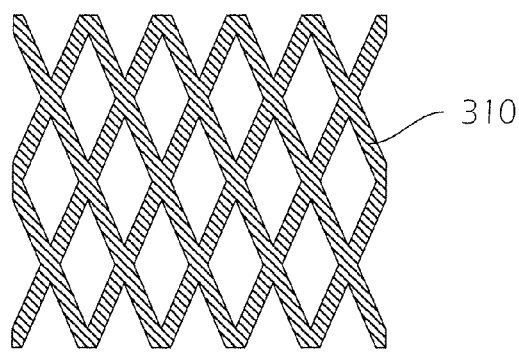
FIG. 3A is a schematic cross-sectional diagram illustrating an intermediate product in the process of fabricating a hollow porous material with architected fluid interfaces according to an embodiment of the present invention.
Figure 3B:
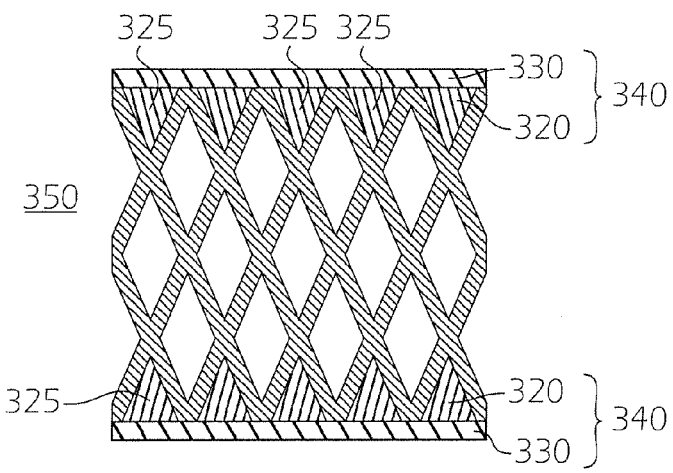
FIG. 3B is a schematic cross-sectional diagram illustrating an intermediate product in the process of fabricating a hollow porous material with architected fluid interfaces according to an embodiment of the present invention.
Figure 3C:
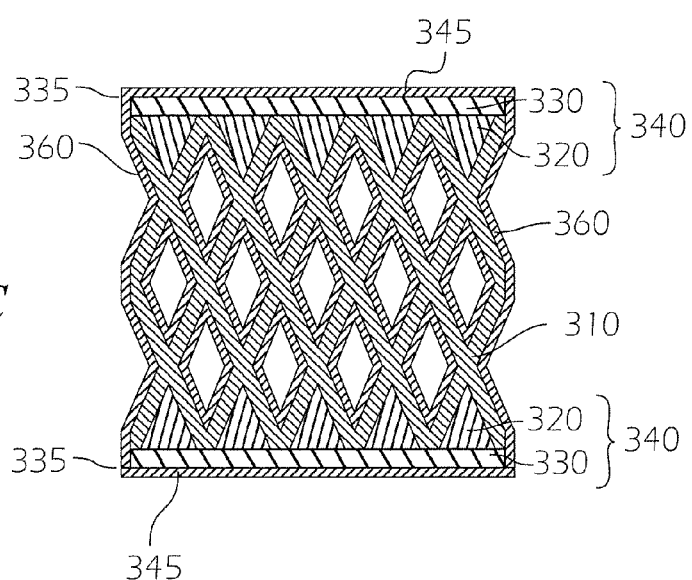
FIG. 3C is a schematic cross-sectional diagram illustrating an intermediate product in the process of fabricating a hollow porous material with architected fluid interfaces according to an embodiment of the present invention.

Referring to FIG. 3A, an open-celled sacrificial scaffold, which may be a three-dimensional micro-truss sacrificial scaffold 310, may appear as shown in cross-section along a suitably chosen cutting plane. Referring to FIG. 3B, when one surface of the open-celled sacrificial scaffold is partially immersed in bonding agent 320 the bonding agent 320 may, if it has suitable properties including a wetting affinity for the material of the open-celled sacrificial scaffold, wick, under the effect of capillary action, part-way into the open-celled sacrificial scaffold forming pyramidal intrusions 325 into the open-celled sacrificial scaffold. These pyramidal intrusions 325 may appear triangular in cross section, as in FIG. 3B. A face sheet 330 may be bonded in place by the bonding agent 320; the combination of the bonding agent 320 and the face shield may be referred to as a sacrificial manifold core 340. The process may be repeated for an opposing surface, so that there are two sacrificial manifold cores 340 as illustrated. Referring to FIG. 3C, a coating 360 may be applied to the entire sacrificial scaffold assembly 350 and shallow cuts 335 or score marks may be made to allow portions 345 of the coating 360 to be peeled away. In one embodiment, the coating may contain several layers, applied in sequence.

Figure 3D:
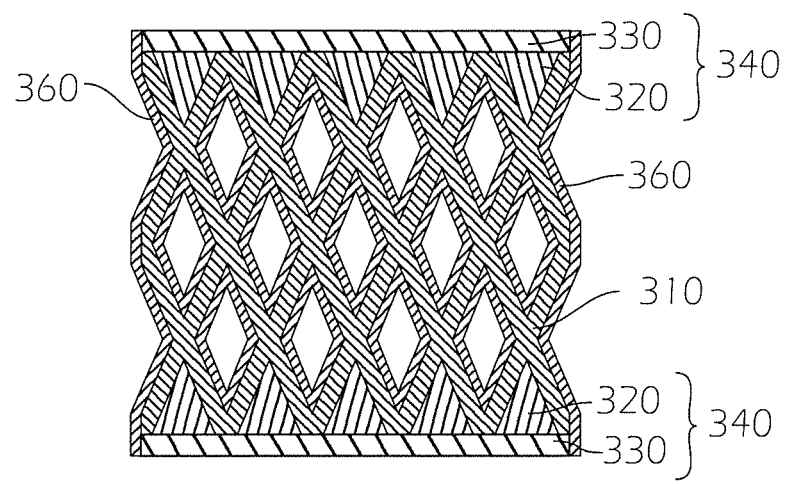
FIG. 3D is a schematic cross-sectional diagram illustrating an intermediate product in the process of fabricating a hollow porous material with architected fluid interfaces according to an embodiment of the present invention.
Figure 3E:
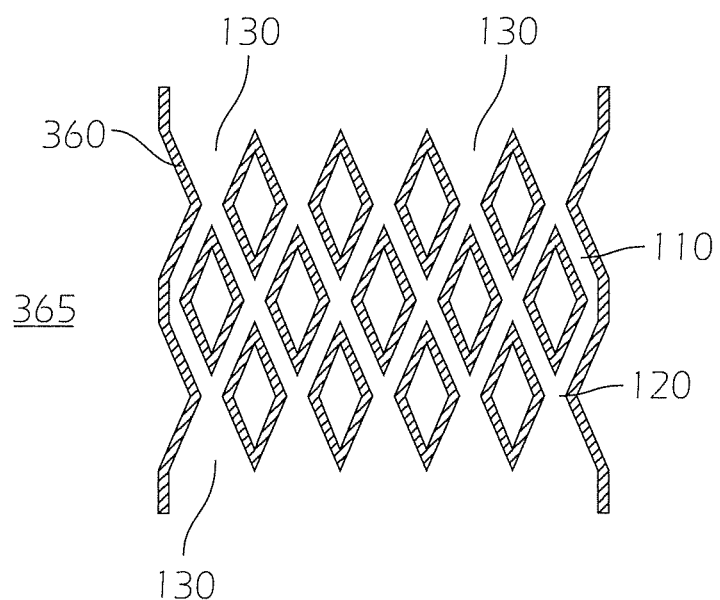
FIG. 3E is a schematic cross-sectional diagram illustrating a hollow porous material with architected fluid interfaces according to an embodiment of the present invention.

The assembly after removal of the portions 345 may appear as in FIG. 3D. The sacrificial scaffold assembly 350 (FIG. 3B) may then be etched out to leave the hollow open-celled structure with architected fluid interface 365 shown in cross section in FIG. 3E, and a three-dimensional perspective view of which is shown in FIG. 1. In addition to being three-dimensional, FIG. 1 more faithfully represents curved surfaces, corresponding to menisci formed by the bonding agent 320, at the entrances to the tapered openings, than does the schematic cross-sectional diagram of FIG. 3E, in which these appear as sharp corners. The pyramidal intrusions 325 formed during partial immersion in the bonding agent 320 become, after the sacrificial scaffold assembly 350 has been coated and then etched out of the coating 360, tapered openings in the form of hollow pyramids 130. The hollow open-celled structure with architected fluid interface 365 may form an integral structure, in the sense that a path can be drawn from any point in the structure to a corresponding layer at any other point in the structure, where the entire path is within one material.

Referring to FIGS. 4A-4F, the depth to which the sacrificial scaffold assembly 350 is immersed in bonding agent 320, and the extent to which the bonding agent 320 wicks into the sacrificial scaffold assembly 350, may affect the shape of the architected fluid interface which results. In FIGS. 4A-4F, cross sections through the coating 360 remaining after etching are shown as heavy lines rather than cross-hatched areas, for clarity in light of the coating's low thickness.

Figure 4A:
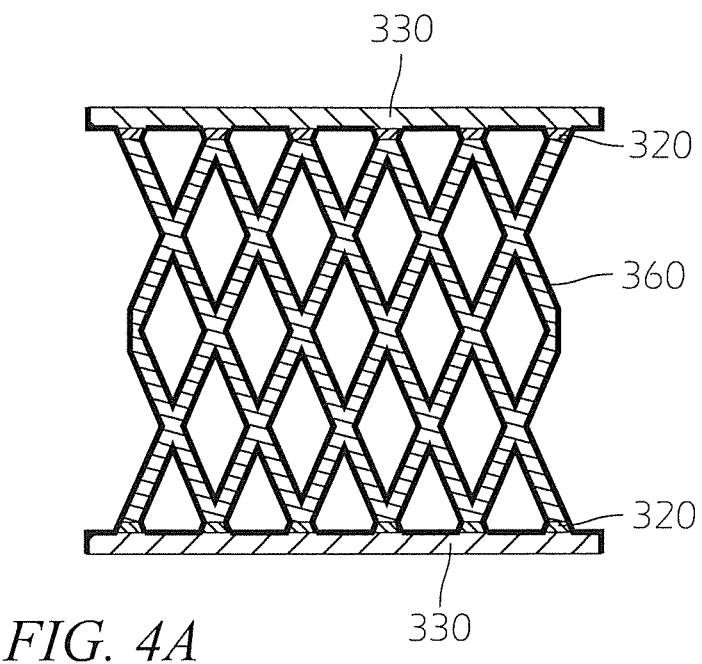
FIG. 4A is a schematic cross-sectional diagram illustrating an intermediate product in the process of fabricating a hollow porous material with architected fluid interfaces according to an embodiment of the present invention.

Referring to FIG. 4A, in one case, an amount of bonding agent 320 may be used which only covers the edge nodes of the open-celled sacrificial scaffold. In this case, the manifold pictured in FIG. 4B may result after etching out of the sacrificial scaffold assembly 350. This configuration may not result in the lowest possible pressure drop because of the flat surface areas 510 (FIG. 5A) at which the coating 360 was formed directly on the face sheet 330. Moreover, the tapered openings forming the transitions to the tubes 110 are, in this embodiment, relatively abrupt.

Figure 4B:
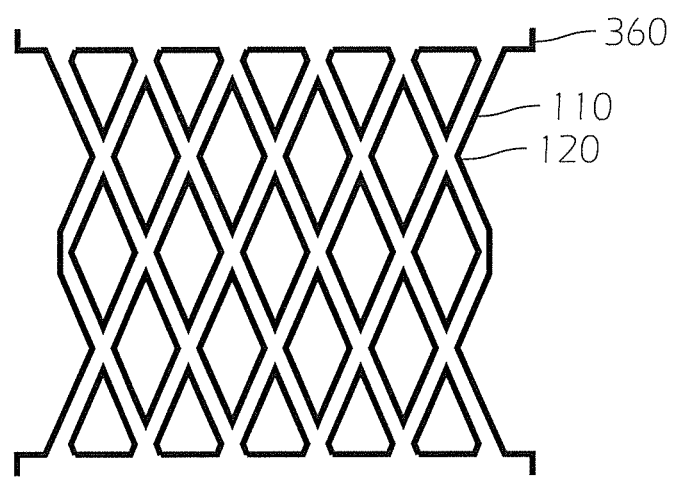
FIG. 4B is a schematic cross-sectional diagram illustrating a hollow porous material with architected fluid interfaces according to an embodiment of the present invention.
Figure 4C:
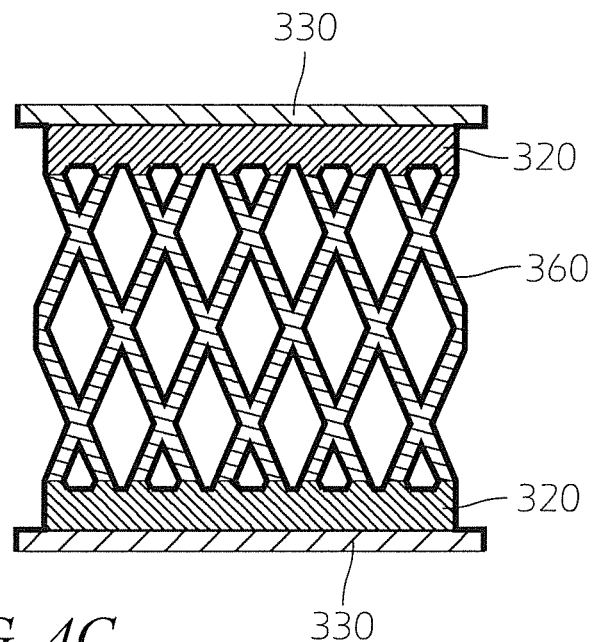
FIG. 4C is a schematic cross-sectional diagram illustrating an intermediate product in the process of fabricating a hollow porous material with architected fluid interfaces according to an embodiment of the present invention.

Referring to FIG. 4C, in another embodiment, an amount of bonding agent 320 which passes the edge nodes but does not reach to the next row of nodes may be used. In this case, the manifold shown in FIG. 4D may result. This manifold lacks the flat surfaces that result in the embodiment of FIGS. 4A and 4B from coating 360 being formed directly on the face sheet 330, because in this embodiment the entire surface of the face sheet 330 is covered in bonding agent 320. Moreover, if the bonding agent 320 has a suitable affinity for the material of the open-celled sacrificial scaffold, then the edges of the pore openings exposed to the bulk fluid may be filleted by the meniscus formed by the bonding agent 320 along the edge of each member of the open-celled sacrificial scaffold. Consequently the embodiment of FIGS. 4C and 4D may show lower pressure drop as fluid flows from the manifold into the tubes 110, and greater pressure recovery when the fluid subsequently exits the tubes.

Figure 4D:
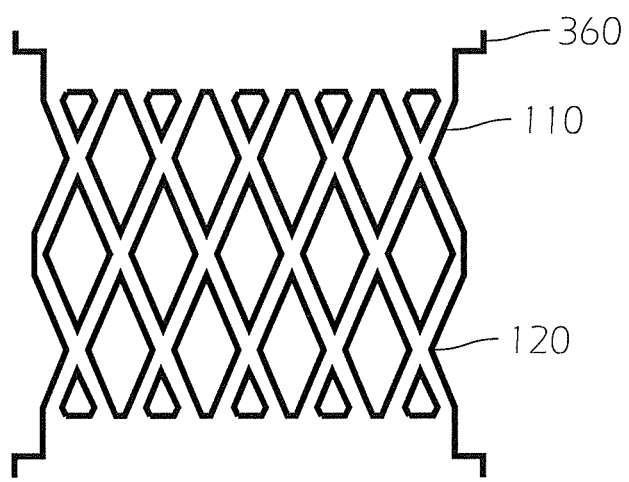
FIG. 4D is a schematic cross-sectional diagram illustrating a hollow porous material with architected fluid interfaces according to an embodiment of the present invention.
Figure 4E:
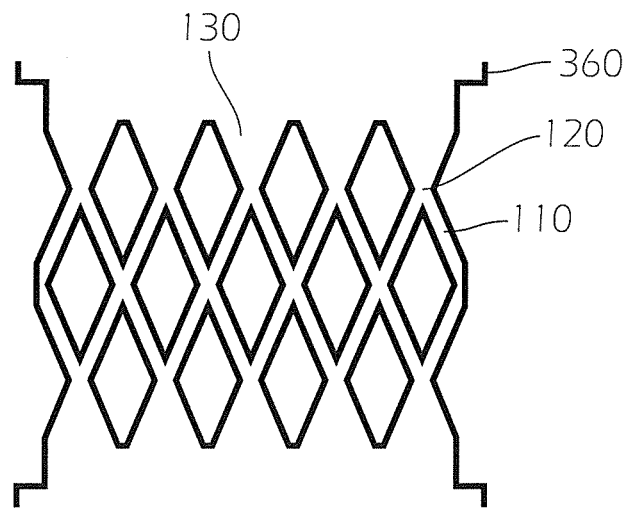
FIG. 4E is a schematic cross-sectional diagram illustrating a hollow porous material with architected fluid interfaces according to an embodiment of the present invention.

Referring to FIG. 4E, in another embodiment, the bonding agent 320 may fill the lower cavities and form pyramidal intrusions 325 extending to the next row of nodes 120, (as also illustrated in FIG. 3B), and a manifold may result having a tapered opening, which may be referred to as a funnel, in the form of a hollow pyramid 130, corresponding to each such pyramidal intrusion 325. A three-dimensional perspective view of this structure is shown in FIG. 1. Each of these tapered openings may guide flow into several tubes 110, the number of tubes 110 per tapered opening being the number of open-celled sacrificial scaffold elements that intersect at each node 120 in the open-celled sacrificial scaffold. In the embodiment of FIGS. 1, 3A-3E and 4E, each tapered opening feeds fluid into four tubes 110. The gradual reduction in diameter as fluid flows from the manifold into the tubes 110 may substantially reduce flow disruption and pressure drop by minimizing the number of pores in direct contact with the bulk fluid.

Figure 4F:
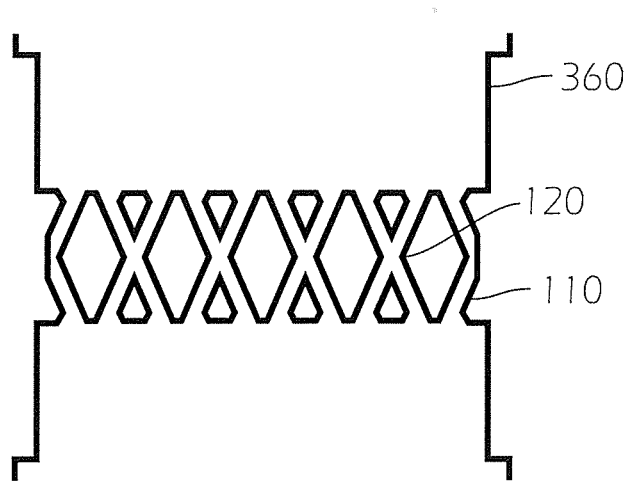
FIG. 4F is a schematic cross-sectional diagram illustrating a hollow porous material with architected fluid interfaces according to an embodiment of the present invention.
Figure 5A:
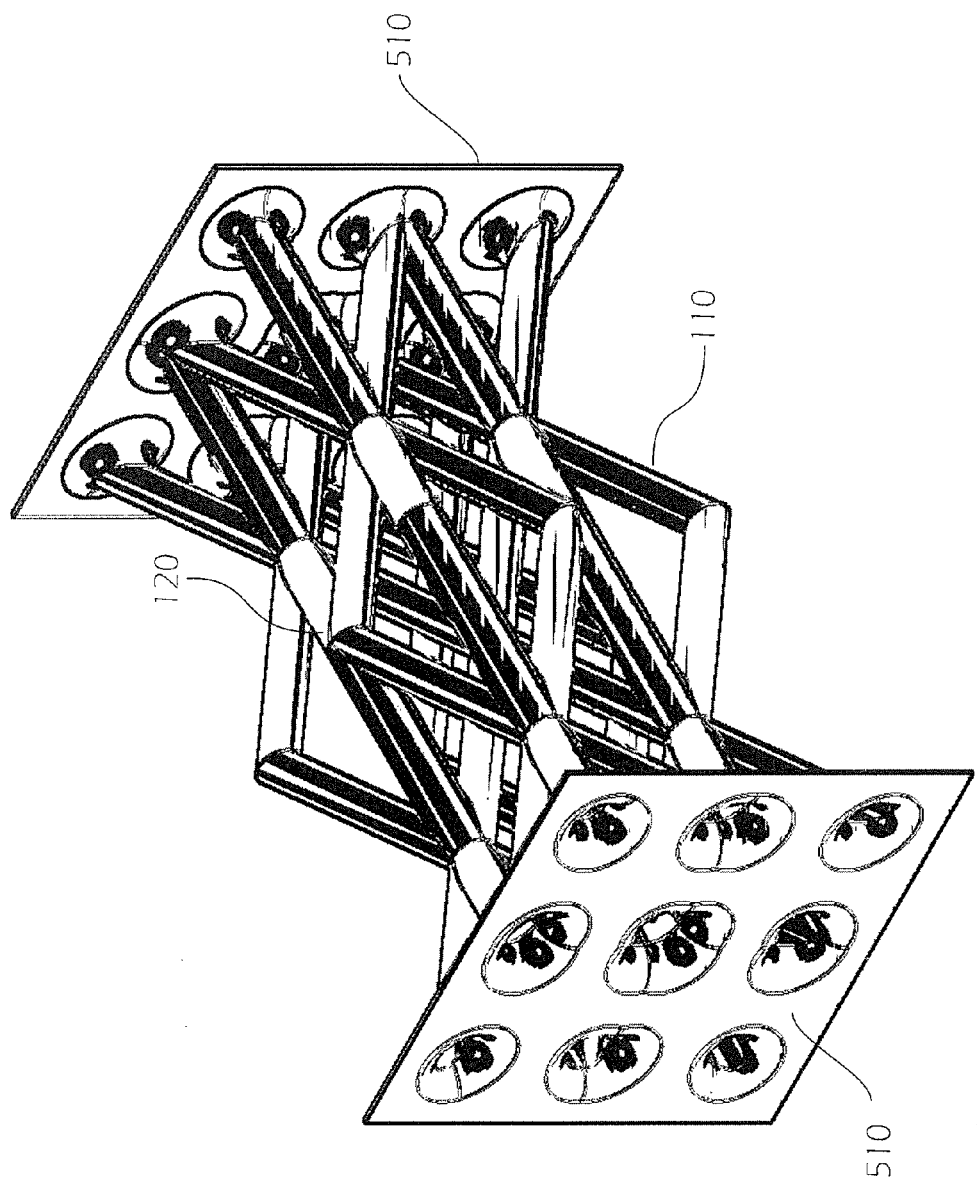
FIG. 5A is a perspective view of a hollow porous material with architected fluid interfaces according to an embodiment of the present invention.
Figure 5B:
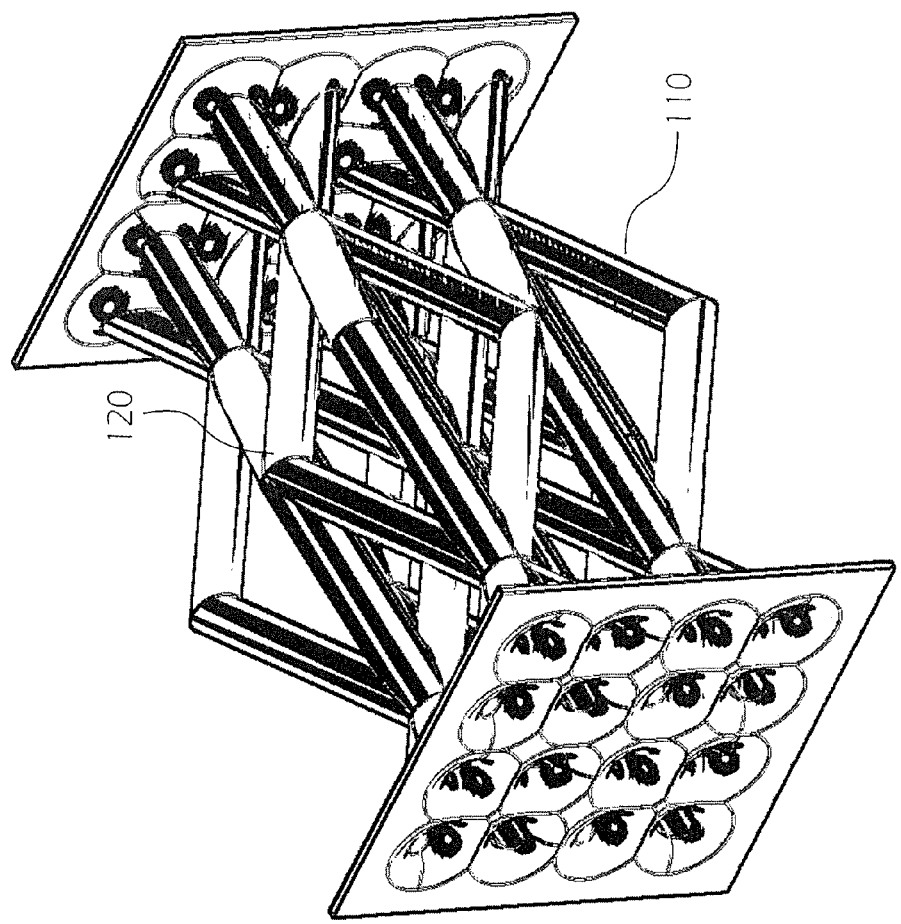
FIG. 5B is a perspective view of a hollow porous material with architected fluid interfaces according to an embodiment of the present invention.
Figure 5C:
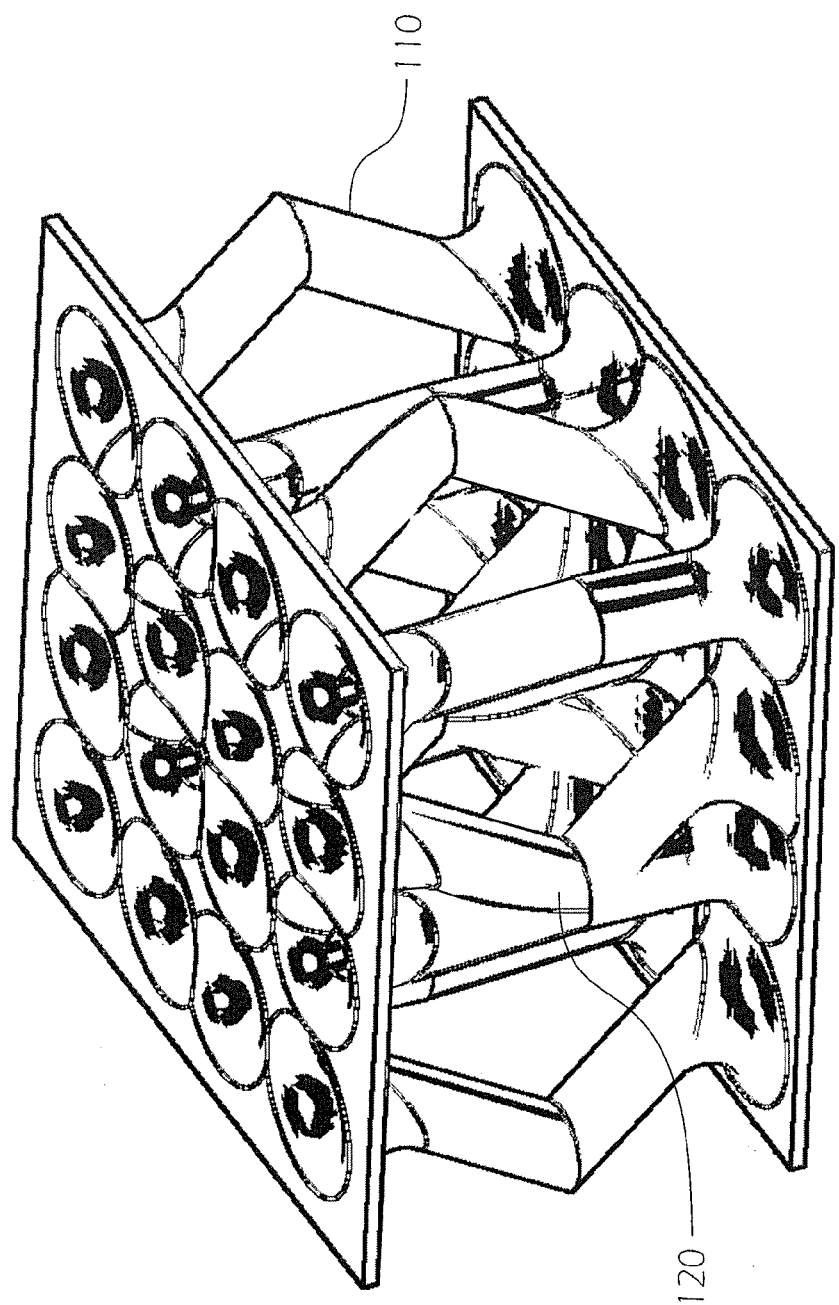
FIG. 5C is a perspective view of a hollow porous material with architected fluid interfaces according to an embodiment of the present invention.

Referring to FIG. 4F, if the bonding agent 320 passes the next row of nodes 120, a manifold similar to that of the embodiment of FIG. 4D may result. Such a structure provides direct fluid access to individual tubes 110, and filleted edges may be formed as the reciprocal of the menisci along the edge of each member of the open-celled sacrificial scaffold. FIGS. 5A, 5B and 5C show three-dimensional perspective views of the structures that may result, after etching, in the embodiments of FIGS. 4B, 4D, and 4F, respectively.

Structures formed according to embodiments of the present invention have several advantages. The gradual, smooth transitions, from manifolds formed according to embodiments of the present invention, to the three-dimensional hollow open-celled structure, and the similarly smooth fluid exit interfaces, minimize pressure loss due to flow contraction, expansion, small vena contracta, and/or separation at the interface between the bulk fluid and the three-dimensional hollow open-celled structure. The final structure may be fabricated from one material, eliminating coefficient of thermal expansion mismatch between different materials and bonding interfaces.

Moreover, a number of variations are possible on the embodiments disclosed. For example, each pore of the surface structure may be architected as a streamtube to reduce pressure loss. Any one or several faces may be enhanced with a surface architecture. Specific locations of the surface architecture may be reinforced against mechanical failure. The individual pores may be formed to be bulbous and may then act as static mixers. The surface structure may also integrate architecture which acts as a particulate filter. The sizes of the pores on the surface structure may be non-homogenous in order to preferentially direct flow into regions of the hollow open-celled structure. Structural alterations may be made to accommodate a counter-flow fluid arrangement and the architecture may be formed to act as a snubber to protect the hollow open-celled structure from pressure spikes.

The characteristics of the gradual transition into and out of the tubes may vary. The gradual transition may be a straight taper or a rounded fillet. A set of straight tapers may form an array of hollow pyramids with open tops (i.e. an array of straight-sided funnels), forming transitions from the micro-truss to the open region (e.g., a duct). Each hollow pyramid may be considered to have a base, a top, and a number of sides, where the top of each pyramid is connected to a node, with a leak-free connection. The base of each pyramid is a polygon. The base is open to the open region, i.e., to the bulk fluid. The polygons have the same symmetry as the micro-lattice unit cell on that side, e.g., rectangular for a micro-truss with a rectangular prism unit cell, or hexagonal for a micro-truss with a hexagonal prism unit cell. The number of sides is equal to the number of line segments comprising the perimeter of the base of the pyramid. The angle between two opposing sides may range from 5 degrees to 130 degrees, where an angle between 50 and 70 degrees may improve ease of manufacturing, and where an angle between 10 and 30 degrees may provide better performance from a minimum pressure drop aspect.

An array of filleted openings between the tube sheet, i.e., the flat perforated interface surface of FIG. 4B, and the micro-truss tube terminal ends, may also form a transition from the micro-truss to the open region (i.e., the duct or the bulk fluid). The micro-truss may terminate somewhere in the middle of the tubes (i.e. between nodes) resulting in rounded fillets in the middle of the tubes. The micro-truss may terminate at a series of nodes resulting in rounded fillets at the nodes. In one embodiment, the radius of each of the fillets is between 0.1 times the radius of the micro-truss terminal end it connects to and half of the distance between truss members (or nodes, depending on whether the micro-truss terminates in nodes or the middle of lattice members). In another embodiment the radius of the fillets is between 0.5 and 1.5 times the radius of the micro-truss terminal end it connects to. The fillet of one micro-truss terminal end may be connected to, or merged into, the fillet of another micro-truss terminal end in such a manner that no flat tube sheet region is formed.

The present invention may be useful in any application in which fluid may flow through a three-dimensional hollow open-celled structure. Examples of such applications include heat exchangers which could find use as oil coolers, evaporators, condensers, and radiators. The invention may be used with any of a variety of fluids, including ambient air, water, and heat transfer fluids.

Embodiments of the present invention may have similar advantages at the outlets of the tubes, at which fluid flows from each tube into a manifold. In this region, the invention may provide, in effect, a diffuser at each transition between a tube and the bulk fluid to minimize pressure loss.

Although limited embodiments of hollow porous materials with architected fluid interfaces for reduced overall pressure loss have been specifically described and illustrated herein, many modifications and variations will be apparent to those skilled in the art. Accordingly, it is to be understood that the hollow porous materials with architected fluid interfaces for reduced overall pressure loss constructed according to principles of this invention may be embodied other than as specifically described herein. The invention is also defined in the following claims, and equivalents thereof.

What is claimed is:

1. A structure comprising:
a structure body, comprising a plurality of hollow channels, and
a first manifold on a first surface of the structure body, the first manifold comprising a first plurality of tapered openings into the hollow channels, each tapered opening having a wide end and a narrow end, only the narrow ends of the tapered openings being connected to the hollow channels,
the surface of each tapered opening having the shape of a meniscus,
wherein the hollow channels interpenetrate each other at a plurality of hollow nodes,
wherein the hollow channels, the hollow nodes, and the manifold form an integral structure, and
wherein the hollow channels are hollow truss elements within a hollow three-dimensional micro-truss.

2. The structure of claim 1, wherein the cross section of each tapered opening of the first plurality of tapered openings is a polygon.

3. The structure of claim 2, wherein the cross section of each tapered opening of the first plurality of tapered openings is a quadrilateral and the surface of each tapered opening has the shape of a hollow pyramid.

4. The structure of claim 1, wherein the hollow three-dimensional micro-truss comprises:
a plurality of first hollow truss elements extending along a first direction;
a plurality of second truss hollow truss elements extending along a second direction; and
a plurality of third truss hollow truss elements extending along a third direction.

5. The structure of claim 1, wherein the hollow truss elements are substantially tubular, and the inner diameter of the hollow channels is at least 10 microns and at most 2 millimeters.

6. The structure of claim 1, wherein the wall thickness of the hollow truss elements is at least 10 nanometers and at most 0.5 millimeters.

7. The structure of claim 1, wherein the length of the hollow truss elements is at least 40 microns and at most 25 millimeters.

8. The structure of claim 1, further comprising a second manifold on a second surface of the structure body, the second manifold comprising a second plurality of tapered openings into a plurality of the hollow channels.

9. The structure of claim 8, wherein at least one of the tapered openings of the first plurality of tapered openings is in fluid communication with at least one of the tapered openings of the second plurality of tapered openings.

10. The structure of claim 1, comprising as a major component, a substance selected from the group consisting of polymers, metals, ceramics, composite materials, hydrophilic materials, hydrophobic materials, photocatalytic materials, and combinations thereof.

11. The structure of claim 1, comprising, as a major component, a polymer selected from the group consisting of fluoropolymers, parylene AF4, parylene-N, parylene-C, and combinations thereof.

12. The structure of claim 1, wherein the structure body is a hollow open-cell foam.

13. The structure of claim 1, wherein the hollow channels, the hollow nodes, and the manifold comprise two layers of different materials.

14. A structure comprising:
    a structure body, comprising a plurality of hollow channels, and
    a first manifold on a first surface of the structure body, the first manifold comprising a first plurality of tapered openings into the hollow channels, each tapered opening having a wide end and a narrow end, only the narrow ends of the tapered openings being connected to the hollow channels,
    wherein the hollow channels interpenetrate each other at a plurality of hollow nodes,
    wherein the hollow channels, the hollow nodes, and the manifold form a continuous structure without a joint, and
    wherein the hollow channels are hollow truss elements within a hollow three-dimensional micro-truss.

15. The structure of claim 14, wherein the surface of each tapered opening has the shape of a pyramid.

* * * * *